United States Patent [19]
Kotzin et al.

[11] Patent Number: 5,734,967
[45] Date of Patent: Mar. 31, 1998

[54] METHOD AND APPARATUS FOR REDUCING SELF INTERFERENCE IN A COMMUNICATION SYSTEM

[75] Inventors: Michael D. Kotzin, Buffalo Grove; Kenneth A. Stewart, Palatine, both of Ill.

[73] Assignee: Motorola, Inc., Schaumburg, Ill.

[21] Appl. No.: 575,450

[22] Filed: Dec. 20, 1995

Related U.S. Application Data

[63] Continuation of Ser. No. 198,971, Feb. 17, 1994, abandoned.
[51] Int. Cl.6 .................................................. H04B 15/00
[52] U.S. Cl. ............................ 455/63; 455/33.2; 455/67.1; 370/252
[58] Field of Search ........................... 455/33.1, 33.2, 455/34.1, 54.1, 56.1, 62, 63, 67.1, 67.4; 370/231, 232, 236, 320, 441, 252, 253, 468; 375/205

[56] References Cited

U.S. PATENT DOCUMENTS

| | | | |
|---|---|---|---|
| 5,070,536 | 12/1991 | Mahany et al. | 455/67.4 |
| 5,103,459 | 4/1992 | Gilhousen et al. | 375/205 |
| 5,115,429 | 5/1992 | Hluchyj et al. | 370/232 |
| 5,179,571 | 1/1993 | Schilling | 375/205 |
| 5,280,472 | 1/1994 | Gilhousen et al. | 370/18 |
| 5,309,474 | 5/1994 | Gilhousen et al. | 455/33.1 |
| 5,327,576 | 7/1994 | Uddenfeldt et al. | 455/33.2 |
| 5,341,456 | 8/1994 | DeJaco | 395/2.23 |
| 5,414,796 | 5/1995 | Jacobs et al. | 395/2.3 |

*Primary Examiner*—Reinhard J. Eisenzopf
*Assistant Examiner*—Thanh Le
*Attorney, Agent, or Firm*—Richard A. Sonnentag

[57] ABSTRACT

A code division multiple access (CDMA) communication system reduces interference by reducing the encoding rate for selected mobiles. The system primarily uses link related characteristics such as, inter alia, distance measurements, physical resource power and mobile determined noise, to determine which mobiles require a encoding rate reduction. Once determined, the encoding rate of the determined mobiles is reduced, which in turn reduces self-interference and enhances system capacity.

9 Claims, 3 Drawing Sheets

METHOD AND APPARATUS FOR REDUCING SELF INTERFERENCE IN A COMMUNICATION SYSTEM

This is a continuation of application Ser. No. 08/198,971, filed Feb. 17, 1994 and now abandoned.

FIELD OF THE INVENTION

The present invention relates to communication systems and more specifically to controlling encoding rates in such communication systems.

BACKGROUND OF THE INVENTION

In recent years a variety of techniques have been used to provide multi-user mobile communications within a limited available radio-frequency spectrum. These methods have included frequency division multiple access (FDMA), time division multiple access (TDMA), and code division multiple access (CDMA) or, more usually, hybrids of these methods. All of these methods have been employed within the past decade in the design of commercial cellular telecommunications systems: witness the use of FDMA in the North American AMPS system, FD/TDMA in the European Groupe Speciale Mobile (GSM) standard, and—more recently—the adoption of a direct sequence FD/CDMA approach by the United States Telecommunications Industry Association as embodied in its IS-95 standard. In the IS-95 standard, subscribers share one of several wideband radio channels in the cellular band. Several proposals for so-called personal communications systems (PCS) are also being designed on similar FD/CDMA principles.

Almost all recent cellular and PCS systems have used digital speech encoding and forward channel error correction as the physical layer for voice communication. More interesting, in this context, is the use of voice activity detection (VAD) to recognize the presence or absence of speech on the part of the either calling party. In the absence of speech, the speech encoder may instruct the modulator or transmitter to which it is linked to reduce its output power to zero, or transmit occasional packets of information describing only the background noise at the either user's location. Reducing the radio transmitter's duty cycle in this fashion provides the twin benefits of a reduction in power consumption (which increases battery life in the case of the mobile unit) and a reduction in interference between users sharing the same RF spectrum. Depending on the circumstances of the conversation, a reduction in transmitted power of between 40% and 65% can be achieved. The amount of power reduction is ultimately limited by the extent to which the degraded voice quality which accompanies significant VAD techniques is considered acceptable.

The possibility of power reduction is particularly important for CDMA systems. In such systems, user capacity is inversely proportional to the amount of system self-interference. In the TIA IS-95 FD/CDMA standard, a variable rate speech encoder is used in place of simple on-off or discontinuous transmission methods. The TIA IS-96 standard—which describes the speech encoder and decoder which accompanies the IS-95 system—divides the source 64 kbps PCM speech samples into 20 ms intervals or frames. The speech encoder then elects to encode each frame at a effective bit rate of 8000 bps, 4000 bps, 2000 bps, or 800 bps. Both the base-station to mobile station (forward) and mobile station to base-station (reverse) IS-95 links exploit this variable rate encoding method. In the case of the forward link, mean transmit power is reduced by scaling down the output power as the encoded rate decreases. Channel symbol repetition allows symbol combining at the mobile receiver and hence maintenance of the energy per symbol to noise power spectral density ratio which determines link performance. While variable rate transmission has little benefit in terms of power consumption at the base station, it should be noted that mean transmit power—and hence system self-interference—is reduced by a factor of four during 800 bps transmission. By averaging over the aggregate voice activity for typical two-way conversations, it has been estimated that when using the standard speech encoding and voice activity detection algorithm defined in TIA standard IS-96 the mean transmit power will drop to around 41% of its nominal value. This has a significant effect on both system forward and reverse link capacity.

As a cellular mobile communications system designed on CDMA principles (such as TIA standard IS-95) approaches periods of peak tele-traffic demand, it is possible to temporarily increase overall system capacity at the expense of reduced voice quality. One way of achieving this is to force the mean transmitted bit rate on both the forward and reverse directions of a link to lower levels than would normally be selected by the TIA IS-96 rate determination algorithm. This can be done by simply placing an upper bound on the rate that may be selected by the rate determination algorithm at either end of a link. A slightly more sophisticated approach is to vary this upper bound on a duty-cycle basis. For example, a user might be allowed to transmit two frames using full-rate as the maximum allowable rate, then a single frame at a maximum allowable rate of half-rate, with the cycle then repeating. The duty-cycle ratio and allowable rates determine the mean reduction in transmitted power over that delivered by a constraint-free speech encoder. Clearly this technique includes less sophisticated VAD schemes where, for example, only a full-rate and a background noise description rate exist. It may even be extended to systems in which only a single rate exists. In that case encoded speech frames are simply blanked (that is, not transmitted) with the receiving speech decoder performing interpolation or frame substitution to reconstruct the missing speech waveform segments.

Thus a need exists for a system and technique which may increase system capacity without sacrificing voice quality in the above-mentioned environment.

DETAILED DESCRIPTION OF A PREFERRED EMBODIMENT

Figure 1:
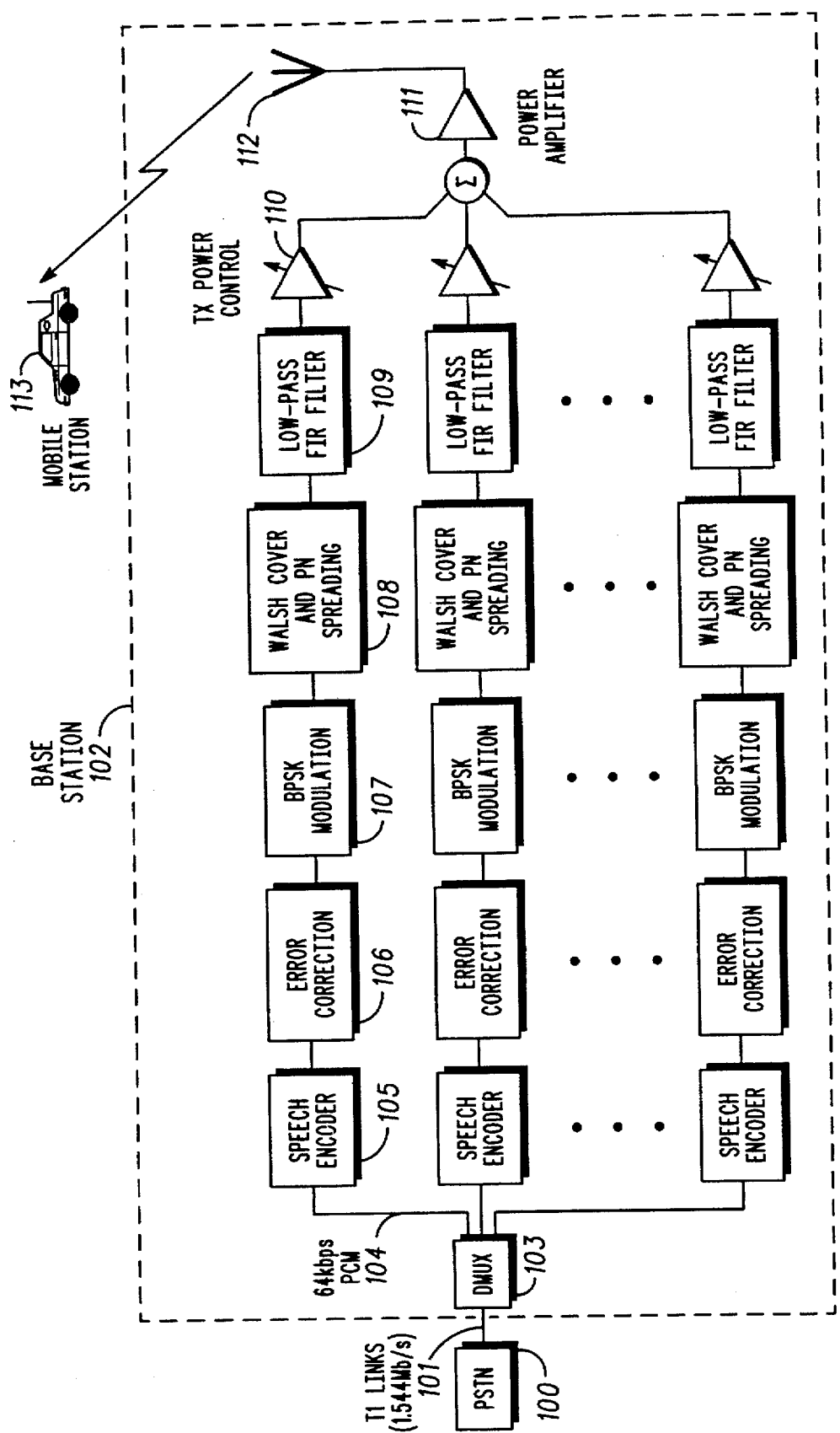
FIG. 1 generally depicts, in block diagram form, a prior art CDMA base-station transmitter.

A code division multiple access (CDMA) communication system reduces interference by reducing the encoding rate for selected mobiles. The system primarily uses link related characteristics such as, inter alia, distance measurements, physical resource power, mobile determined noise, to determine which mobiles require a encoding rate reduction. Once determined, the encoding rate of the determined mobiles is reduced, which in turn reduces self-interference and enhances system capacity.

The technique of enforced speech encoder rate reduction to achieve increased system capacity can be significantly improved by realizing that the propagation loss between the mobile station and base-station is generally a geometric function of the distance which separates them. Accordingly, mobile stations which are operating in a cell at some distance from their serving base-station make a disproportionate contribution to the interference experienced at base-stations serving adjacent cells. This is a direct consequence of the need for distant mobile stations within a cell to transmit more power in order to sustain the necessary signal to noise (S/N) ratio at the receiving base-station to ensure reliable demodulation. The effect is compounded by the fact that such mobile stations are generally positioned closer to the adjacent base-stations with which they are interfering than with the serving base-station. This results in a corresponding reduction in path loss, and consequent increase in interference. Such mobile stations are also the primary source of interference on the forward link, since they make most demands on the transmitted power of a serving base station, with attendant increase in the system self-interference experienced both by mobile stations in adjacent cells and (depending on the spreading codes used and the amount of channel time dispersion) those in the same cell. This observation is already exploited in so-called "soft handoff" methods, in which a mobile station establishes simultaneous links with one or more base-stations in order to reduce the overall system self-interference.

If mobile stations which are distant from their serving base station, or base stations, could be identified and selected for rate reduction, system capacity is increased by almost as much as if rate reduction had been applied to all mobile stations regardless of their position within the cell. This in turn restricts the loss of voice quality which accompanies rate reduction to only the selected subset of mobile stations rather than the entire population with a resultant improvement in overall system voice quality.

The communication system controls encoding rate by determining link related characteristics from a plurality of mobiles and controlling the encoding rate of certain mobiles based on the determined link related characteristics. Link related characteristics include, but are not limited to, the handoff state of a mobile (soft or hard handoff state), the location of a mobile (with respect to serving base-station or adjacent base-stations), transmission characteristics of the mobile (for example, the current transmission level of the mobile), transmission characteristics of a serving base-station (for example, the current transmission level of the serving base-station) and the amount of acoustic background noise experienced by the mobile (for example, the amount of acoustic background noise experienced by the mobile during communication with a serving base-station).

The preferred embodiment of the invention is described as it relates to a CDMA digital cellular telecommunications system based on the Telecommunications Industry Association standards IS-95 and IS-96. It will be appreciated by one skilled in the art that the invention may be applied to any CDMA communications system to which self-interference reduction by variable rate speech encoding is to be applied. The technique may likewise be beneficially utilized in any TDMA communications system, such as the GSM TDMA communication system, as well.

FIG. 1 shows the high-level architecture of the forward link of a CDMA base-station (102) designed for the preferred embodiment of the TIA IS-95 digital cellular radio standard. The base-station (102) of FIG. 1 performs, inter alia, variable rate speech encoding, forward error correction, forward link power control, multiple access spreading, and modulation and transmission. In FIG. 1, several standard μ-law encoded, multiplexed, 64 kbps pulse code modulated (PCM) T1 links (101) from the public switched telephone network (PSTN) (100) are brought to a demultiplexer (103). Each 64 kbps voice link (104) is then passed through a digital speech encoder (105). In a conventional implementation, the speech encoding function is performed by a number of general purpose digital signal processors (DSP's) such as the Motorola DSP56156 processor, ROM coded DSP's, or application specific integrated circuits (ASICs). Several such processors are generally grouped onto a single printed circuit board (although this is not necessary for the invention) which is then capable of processing a full T1 trunk of multiplexed voice channels. After speech encoding, error correction (106) is applied in the form of convolutional and cyclic codes, followed by BPSK baseband modulation (107), Walsh cover and short pseudo-noise (PN) sequence spreading (108), low-pass filtering (109), transmit power level adjustment (110) and power amplification (111), and finally transmission to the mobile station (113) (for simplicity, frequency shifting to RF is not shown).

Figure 2:
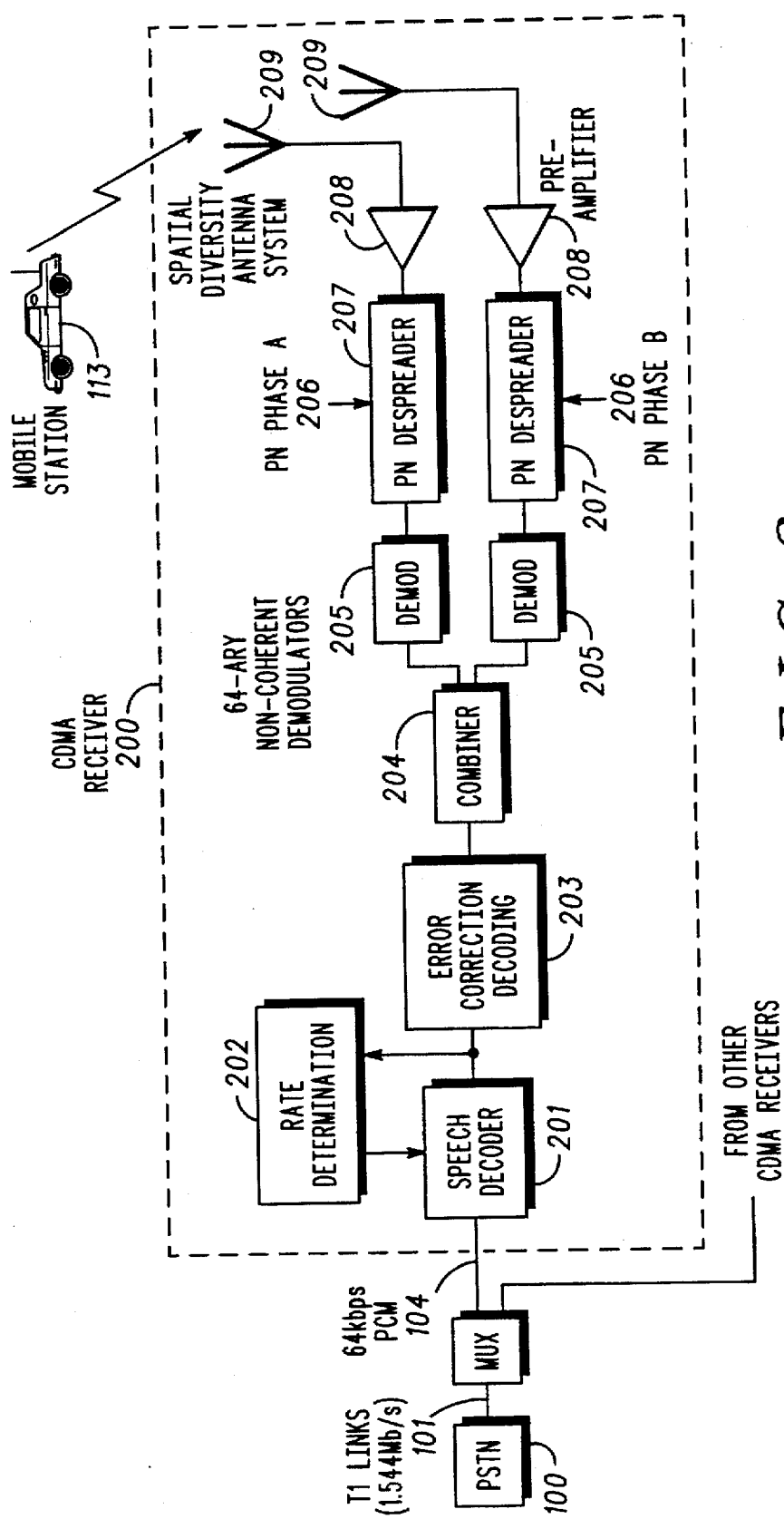
FIG. 2 generally depicts, in block diagram form, the receive side of a CDMA base-station.

FIG. 2 depicts the high-level architecture of the receive side of CDMA base-station. In general, FIG. 2 shows one of many individual receivers which comprise the base-station and which perform multiple access signal despreading, antenna combining, demodulation, forward error correction decoding, and speech decoding. Specifically, it shows one of several receivers (200) which exist within a base station, and which support multiple reverse connections into the PSTN (100). The RF circuitry of each receiver consists of a spatially diverse antenna system (209), and preamplification circuitry (208) (for simplicity AGC and filtering functions are not shown). Despreading of the user-specific pseudo-noise (PN) spreading sequence used to provide multiple-access takes place in the PN despreader (207) which consists, in the preferred embodiment, of a complex multiplier and an integrator. Note that in order to achieve PN sequence synchronization with the mobile station's transmitted signal, it is necessary in the preferred embodiment for each receiver to retard (relative to a global system time reference) its internally generated PN sequence by approximately twice the one-way RF propagation delay between the base-station and mobile station. This parameter appears in FIG. 2 as the required PN phase (206). Methods for initially estimating (by sequential search, for example) and then tracking (by delay lock loop, for example) this phase offset are well known and will not be described here. For completeness, FIG. 2 shows two despreader units. Each is attached to a single antenna of a second-order spatial antenna diversity system. Where time dispersion exists on the channel, more despreader units may be used. In the context of this invention, the time delay (or equivalently, PN phase (206)) of the first arriving component of a dispersive channel is that used in accordance with the invention in the manner described below. Completing the description of FIG. 2, following non-coherent demodulation (205) of the underlying 64-ary orthogonal signaling, and symbol combining (204), forward error correction decoding (203) is performed before speech frame rate determination (202) and finally speech frame decoding to 64 kbps μ-law PCM format (104). Multiplexing to T1 format (101) and injection into the PSTN follows.

Figure 3:
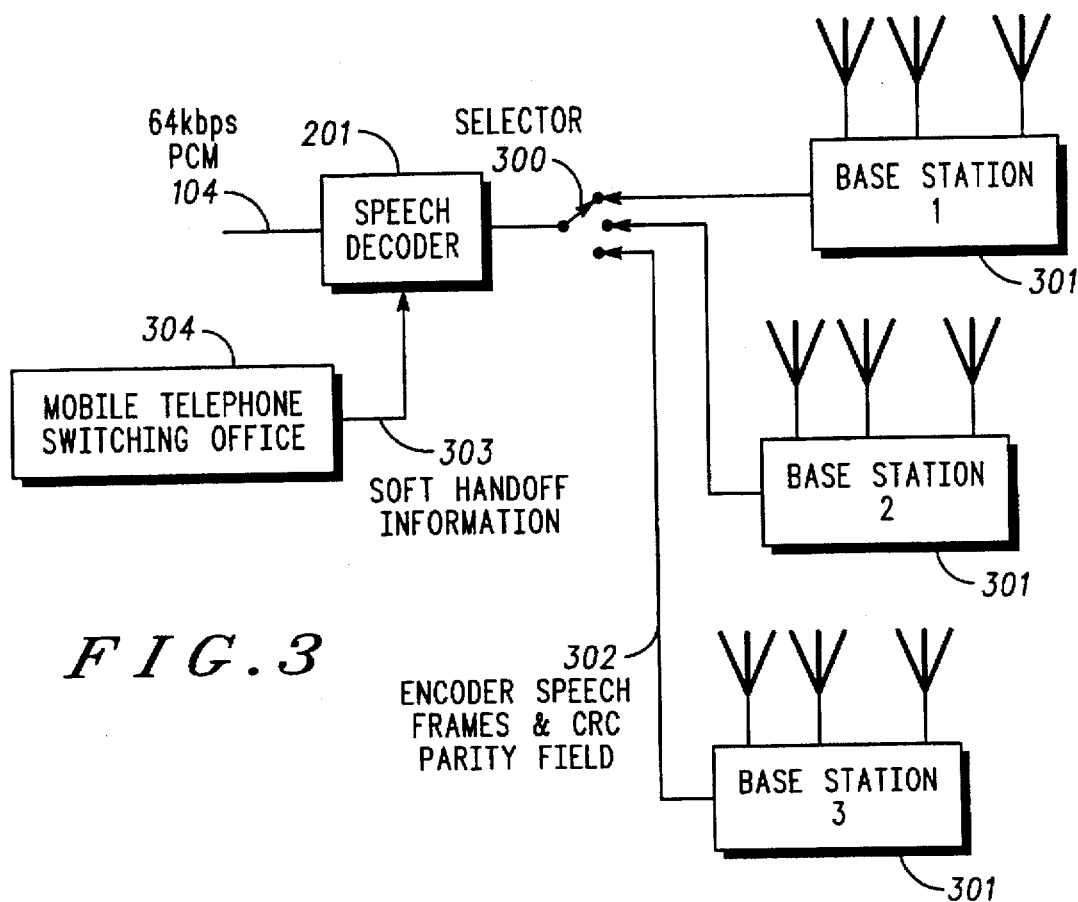
FIG. 3 generally depicts, in block diagram form, a combination of demodulated reverse link signals simultaneously received by a plurality of base-stations from a single mobile station in accordance with the invention.

FIG. 3 shows an elaboration of the FIG. 2 in which a single speech decoder (201) is no longer associated with a single reverse link receiver, but rather may accept demodulated encoded speech frames from any one of several receivers each of which may be housed in a different base-station (301). The speech decoder operates on frames chosen by the selector function which, operating under the control of the mobile telephone switching office (MTSO), accepts for decoding a single 20 ms encoded speech frame from the three frames offered by the base stations. Such a configuration is sometimes referred to as "soft-handoff" or "macro-diversity". Each receiver demodulates the same reverse link signal from the mobile station. In FIG. 3, three base-stations (301) are shown, although there is no limit to the number of base-stations which may be combined in this manner. Note that a selector function (300) has been introduced to identify, on the basis of a cyclic code parity check or some other demodulation quality metric, which of the three encoded speech frames should be accepted for decoding by speech decoder (201). Overall control is provided by MTSO (304) which has identified, by instructing RF signal strength measurements to be made at the base-stations or by receiving signal strength measurements of each base-station signal strength made by the mobile station, that the mobile station is in a location in which roughly comparable path loss exists between each of the base-stations and the mobile unit.

Figure 4:
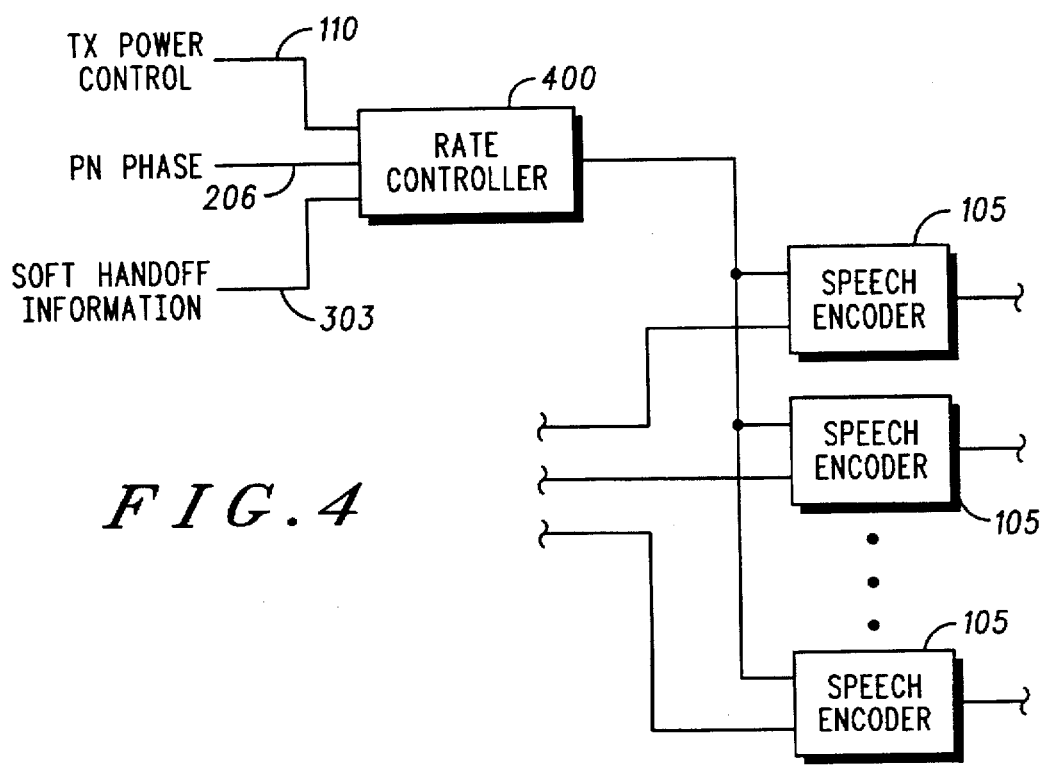
FIG. 4 generally depicts, in block diagram form, a transmitter which may implement speech rate control in accordance with the invention.

With this background, speech rate control for CDMA forward link in accordance with the invention may now be described. FIG. 4 shows a rate controller (400) controlling the rate selected by the speech encoders (105) operating on the forward link. The rate controller (400) accepts a number of different parameters as input; these include inputs from a) the MTSO (304) regarding the soft decision handoff state of the mobile to which the speech encoder is assigned, b) the transmit power control RF circuitry (110) regarding the transmit power level at which the forward link assigned to the mobile station is operating, and c) the PN phase of one or all of the receivers which are currently demodulating the reverse link of the mobile station, and for which the estimated mean energy per bit to noise power spectral density ratio is sufficiently high to provide an accurate PN phase estimate (that is, for which the estimated mean energy per bit to noise power spectral density ratio is above a predetermined threshold which indicates that the receiver is in a locked state—again, methods for establishing this condition are well known and will not be described here). The rate controller (400) then identifies those mobile units which are at greater distance from the serving base station(s) as a precursor to preferentially performing rate reduction on those mobiles. Rate controller (400) makes rate selection decisions for a variable rate speech encoder or places bounds on the rates which may be independently selected by that the rate determination procedure associated with that encoder.

It will be clear that given the information provided to the rate controller (400), rate control can be done in a variety of ways. The distance for each base-station can be estimated by using the transmit power level required to close the forward link. Obtaining the forward link path loss allows the base-station to mobile station separation to be calculated by using one of several available mathematical models relating path loss to distance, or by using measured propagation measurements from the cell in question. An alternative method would establish the base-station to mobile station separation from the measured PN phase (206) by simply calculating the one-way propagation delay from the chip rate (1.2288 Mchips/s in the preferred embodiment), and then multiplying by the velocity of light. A more accurate method would use the distance estimate provided by the PN phase of all the base-stations (301) demodulating a mobile, possibly in concert with knowledge of the geographical location of the base stations, to establish the position of the mobile station by triangulation. Alternatively, since the MTSO has already implicitly established that the mobile station is roughly equi-distant from two or more cells by placing the mobile station in soft handoff status, this condition alone would be sufficient to identify the mobile station as a primary candidate for rate reduction. Finally, some combination of these parameters may be used.

Speech traffic channels or systems are not the only ones which could benefit from the invention. In a data application, the invention could be utilized to adjust the permitted rate of transmitted data to and from a mobile station. It would also be possible to prioritize data transmissions to be reduced or suspended before speech, so to minimize user perceived speech degradation.

Applications may permit this invention to be autonomously employed by the base or the subscriber unit. For example, a subscriber unit might sense that capacity limits are being reached. If in the soft handoff condition or needing a high transmitter power, the subscriber unit might preferentially try to encode its speech using a lower effective average bit rate or reduce the transfer rate if transmitting data. Of course, the base could do similarly.

It is clear that the proposed technique can be extended for use in any digital cellular system which can control the transmission of information to and from a subscriber in a manner that affects generated interference. For example, one other application besides DS-CDMA includes frequency hopping where voice activity or variable rate can be controlled.

While the invention has been particularly shown and described with reference to a particular embodiment, it will be understood by those skilled in the art that various changes in form and details may be made therein without departing from the spirit and scope of the invention.

What we claim is:

1. A method of reducing a self interference in a cellular communication system, the method comprising the steps of:

determining that self interference in a cellular communication system needs to be reduced:

determining, from a plurality of mobile units, a subset of the plurality of mobile units which are greater than a predetermined distance from a serving base station; and reducing an encoding rate on a subset of a plurality of channels to reduce self interference, the plurality of channels corresponding to the subset of the plurality of mobile units wherein the step of adjusting is based on the steps of determining.

2. The method of claim 1, wherein the step of determining a subset of the plurality of mobile units which are greater than a predetermined distance from a serving base station comprises the step of determining if each mobile unit within the plurality of mobile units is in a handoff state.

3. A base station, in a cellular communication system, adjusting encoding rates on a plurality of channels to reduce a self interference, the base station comprising:

a controller receiving data on a link characteristic of each of the plurality of channels, determining that self interference in the cellular communication system needs to be reduced based on the link characteristic, and determining, from a plurality of mobile units, a subset of the plurality of mobile units which are greater than a predetermined distance from a serving base station; and a plurality of speech encoders coupled to the controller wherein said controller reduces the self interference by reducing the encoding rate of the plurality of speech encoders for each of the plurality of channels associated with the subset of the plurality of mobile units.

4. The base station of claim 3, wherein the base station is part of a CDMA cellular communication system.

5. The base station of claim 3, wherein the base station communicates to a plurality of mobile units over the plurality of channels, wherein each of the plurality of mobile units have the same encoding rate as each of the plurality of speech encoders on a corresponding channel from the plurality of channels at the base station.

6. The base station of claim 3, wherein the distance determination includes a determination of handoff state of an associated mobile unit.

7. The base station of claim 3, wherein the link characteristic includes a transmission level of the base station on an associated channel.

8. A digital cellular communication system adjusting a plurality of encoding rates on a corresponding plurality of channels to reduce self interference, the communication system comprising:

a plurality of base stations;

a plurality of mobile units in communication with the plurality of base stations;

a plurality of channels, for connecting the plurality of mobile units to the plurality of base stations, wherein the plurality of channels are reused by the plurality of base stations; and said plurality of base stations each having a controller that receives data on a link characteristic, determines if mobile units within the plurality of mobile units are beyond a predetermined distance, and determines the encoding rate for a plurality of channels based upon the link characteristic, and the distance determination.

9. The digital cellular communication system of claim 8, wherein the plurality of base stations employ a CDMA scheme.

* * * * *